United States Patent [19]
Miller et al.

[11] Patent Number: 5,558,202
[45] Date of Patent: Sep. 24, 1996

[54] APPARATUS FOR MOVING CIRCULAR CONTAINER ENDS

[75] Inventors: David R. Miller, Golden; Gregory J. Fischer, Wheat Ridge, both of Colo.

[73] Assignee: Coors Brewing Company, Golden, Colo.

[21] Appl. No.: 523,228

[22] Filed: Sep. 5, 1995

[51] Int. Cl.⁶ ................................................. B65G 29/00
[52] U.S. Cl. ............................................. 198/624; 198/604
[58] Field of Search .................................. 198/604, 608, 198/620, 624, 780; 193/37

[56] References Cited

U.S. PATENT DOCUMENTS 2,335,594  11/1943  Kerr ........................................ 198/604 X
3,889,798  6/1975  Jurgens et al. ............................. 198/624
5,094,340  3/1992  Avakov ................................. 198/604 X Primary Examiner—James R. Bidwell
Attorney, Agent, or Firm—Klaas, Law, O'Meara & Malkin, P.C.; Joseph J. Kelly

[57] ABSTRACT

Apparatus for applying a pushing force on a plurality of circular container ends to move them over a trough shape tray wherein two spaced apart rollers are each mounted for rotation about a longitudinal axis and each roller has a surface contour in the longitudinal direction comprising a central arcuate section having a radius smaller than the radius of each of the circular container ends and spaced apart linearly extending sections extending from each end of the central arcuate section and cylindrical sections extending from each of the linearly extending sections.

14 Claims, 3 Drawing Sheets

5,558,202

APPARATUS FOR MOVING CIRCULAR CONTAINER ENDS

FIELD OF THE INVENTION

This invention relates generally to apparatus for moving circular container ends and more specifically to the surface contour of the rollers used to move the circular container ends.

BACKGROUND OF THE INVENTION

For years circular container ends have been moved over relatively great distances using trough shape trays or circumferentially spaced apart cylindrical rods by driving apparatus located at spaced apart intervals. Each driving apparatus utilized two spaced apart rollers, each mounted for rotation about a longitudinal axis. In one example of the prior art, each roller is made from a relatively hard plastic material. A plurality of grooves extending in the longitudinal direction are formed in the outer surface with each groove having an arcuate contour having a radius substantially the same as the radius of the curl area of the circular container end. Each groove has an arcuate extent of about ninety degrees. One of the rollers is mounted on a pivotal arm so that, in an emergency, control means can be actuated to pivot the arm to move the rollers out of contact with the circular container ends to stop the movement of the circular container ends. In another example of the prior art, each roller is made from an elastic material, such as urethane. Each roller has a smooth outer surface having a contour extending in the longitudinal direction comprising an upper cylindrical portion spaced from a lower cylindrical portion and an arcuate portion therebetween. The arcuate portion has a radius slightly smaller that the radius of each circular container end. While these prior art examples function to move the circular container ends there is occasional damage to the curl area or outer circumference of a circular container end which is not desirable.

BRIEF DESCRIPTION OF THE INVENTION

This invention provides rollers for use in apparatus for moving circular container ends which rollers are formed from an elastic material, such as a polyurethane having a durometer of between about 55 and 60 (Shore A) or other materials having similar characteristics. Each roller has a longitudinally extending surface contour having a central arcuate section, two linearly extending sections extending from the ends of the central arcuate section and inclined relative to the longitudinal axis of the roller and an upper and lower cylindrical section.

In a preferred embodiment of the invention, the apparatus for moving the circular container ends comprises a tray over which said circular container ends are moved. The tray has a longitudinally extending surface having an arcuate transverse cross-section configuration which has a radius that is slightly greater than the radius of each of the circular container ends. An open ended housing is provided and comprises a base plate, opposite sidewalls and a partial top wall mounted on each of the opposite sidewalls. The tray has opposite cut out portions. A roller formed from an elastic material, such as a polyurethane having a durometer between 55 and 60 (Shore A) and having a longitudinal axis is mounted on each of the partial top walls and has a portion thereof extending through one of the cut out portions. Each of the rollers has an outer surface extending in a longitudinal direction. At least a portion of the outer surface has a contour extending in the longitudinal direction comprising a central arcuate section and a linearly extending section extending from each end of the central arcuate section. The central arcuate section has radius that is smaller than the radius of each of the circular container ends. Each of the linearly extending sections extends in a direction that is inclined relative to the longitudinal axis. Each roller has cylindrical sections extended from the end of each linearly extending section. The linearly extending sections are located to be contacted and deformed outwardly by portions of each of the circular container ends. Drive means are provided for rotating the rollers to apply a pushing force on each of the circular container ends.

The drive means comprise two spaced apart rotatable shafts mounted at fixed locations on the base plate with each shaft having a roller mounted thereon for rotation therewith. A pulley is mounted at a fixed location on each shaft for rotating the shafts. A support plate is mounted on the base plate for pivotal movement. A rotatable drive system or assembly, such as a drive pulley, is mounted on the support plate for movement therewith. Motor means for rotating the drive pulley are mounted on the support plate for movement therewith. The apparatus can be operated using a 110 volt stepper motor which is more efficient and less costly than the motors used in the other systems. An air cylinder is mounted at a fixed location on the base plate and has a movable piston. A drive belt is journalled around at least the drive pulley and the roller pulleys. The drive belt is double sided so as to rotate the rollers in opposite directions. Pressure applying means are provided for applying pressure on the movable piston to move the movable piston in one direction to apply force on the support so that the drive belt contacts the drive pulley and the roller pulleys with sufficient tension to rotate the roller pulleys.

Control means are provided for disconnecting the pressure applying means so that resilient means can apply a force on the movable piston to move the movable piston in a direction opposite to the one direction to move the drive belt out of contact with the drive pulley and stop the movement of the circular container ends.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
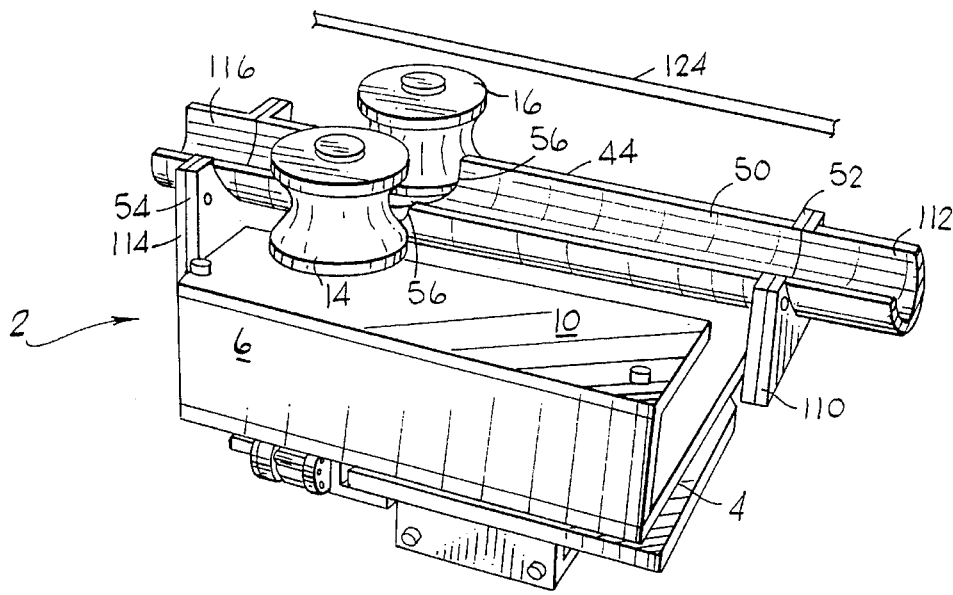
FIG. 1 is a top perspective view of the apparatus of this invention.
Figure 2:
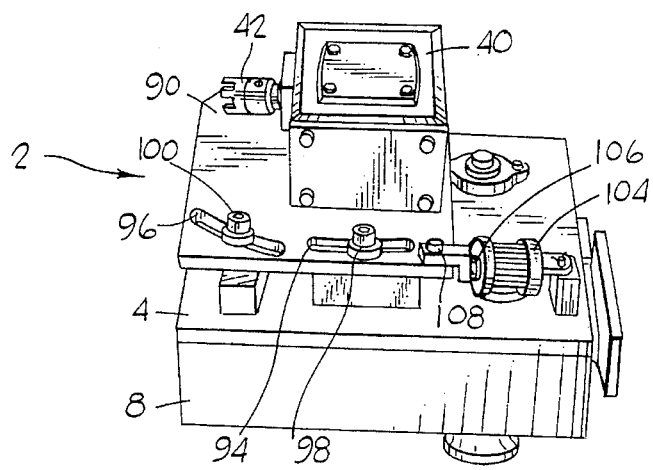
FIG. 2 is a bottom perspective view of the apparatus of this invention.
Figure 3:
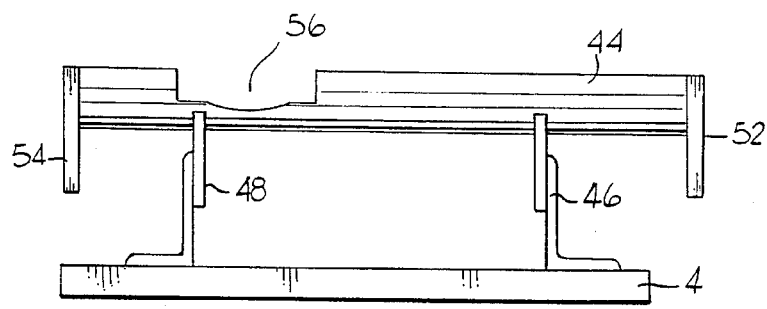
FIG. 3 is a side elevational view with parts removed of a portion of the apparatus of FIG. 1.
Figure 4:
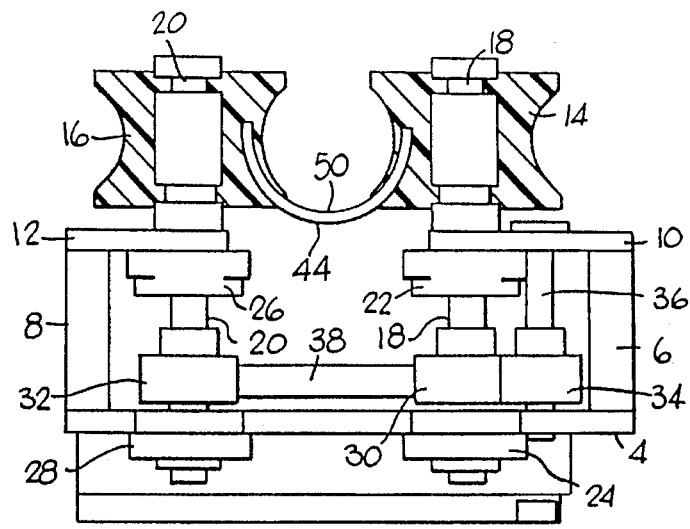
FIG. 4 is a schematic end elevational view with parts removed and parts in section of the apparatus from the left side of FIG. 1.

The apparatus 2 of this invention is illustrated in FIGS. 1–4. An open ended housing is provided and comprises a base plate 4 opposite sidewalls 6 and 8, partial top walls 10 and 12 mounted on the sidewalls 6 and 8. A pair of opposite rollers 14 and 16, described more fully below, are mounted on the shafts 18 and 20 for rotation therewith. The shaft 18 is mounted for rotation in a bearing 22 secured to the top wall 10 and a bearing 24 secured to the base plate 4. The shaft 20 is mounted for rotation in a bearing 26 secured to the top wall 12 and a bearing 28 secured to the base plate 4. A pulley 30 is mounted on the shaft 18 and a pulley 32 is mounted on the shaft 20. An idler pulley 34 is mounted on the shaft 36 for rotation relative thereto. A drive belt 38 is journalled around the pulleys 30, 32 and 34 and is driven by a drive pulley, described below, on the gear reducer 40, FIG. 2, to rotate the shafts 18 and 20 to rotate the rollers 14 and 16. A coupling 42 projecting out of the gear box 40 is connected to the drive coupling (not shown) of a motor (not shown) to rotate the drive gear.

Figure 5:
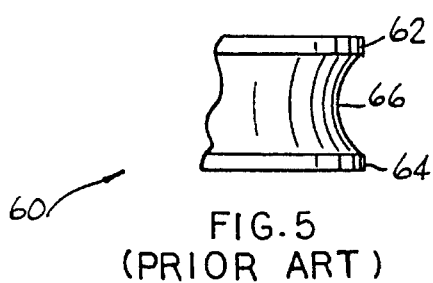
FIG. 5 is an elevational view of a portion of a roller from the prior art.

A trough shaped tray 44 is mounted on the base plate 4 by mounting means 46 and 48 to permit vertical and horizontal adjustments. The tray has an inner arcuate surface 50 having a radius slightly greater than the radius of the circular container ends. Mounting plates 52 and 54 are located at each end of the tray 44 and are connected to the end of the relatively long trays over which the circular container ends are moved. The tray 44 is provided with opposite cut out portions 56 so that the rollers 14 and 16 can contact the circular container ends In FIG. 5, there is illustrated a drive roller 60 of the prior art formed from a poly urethane material. The outer surface of drive roller 60 comprises an upper cylindrical surface 62 and a lower cylindrical surface 64. A central arcuate surface 66 is an arc of a circle having a radius that is slightly smaller than the radius of the circular container end that is being driven. The axial extent of each of the cylindrical surfaces 52 and 54 is 0.375 inch and the overall axial extent of the drive roller 50 is 2.250 inches.

Figure 6:
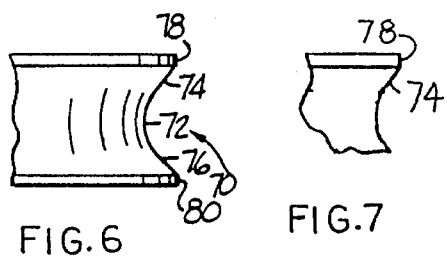
FIG. 6 is an elevational view of a portion of a roller of this invention.
Figure 7:
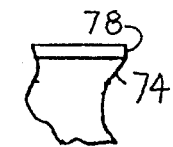
FIG. 7 is an elevational view of a portion of FIG. 6.
Figure 8:
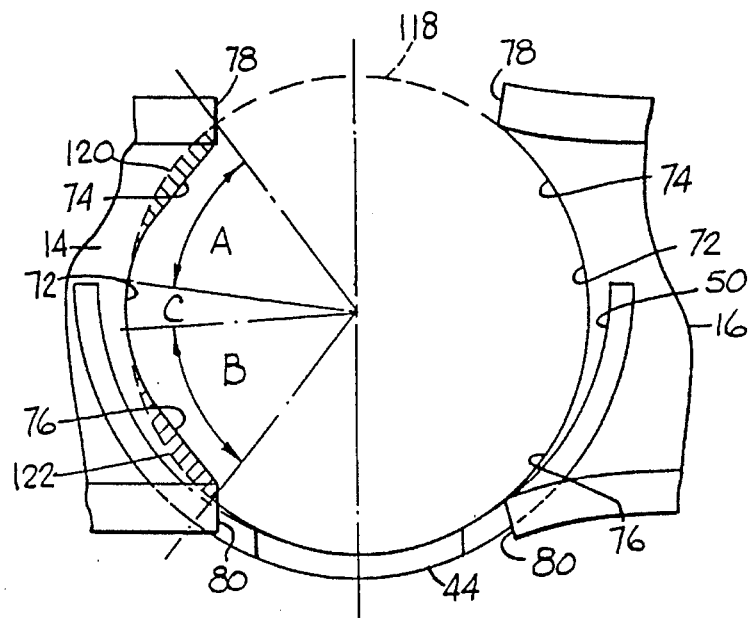
FIG. 8 is an elevational view illustrating the portions of the rollers that are deformed.
Figure 9:
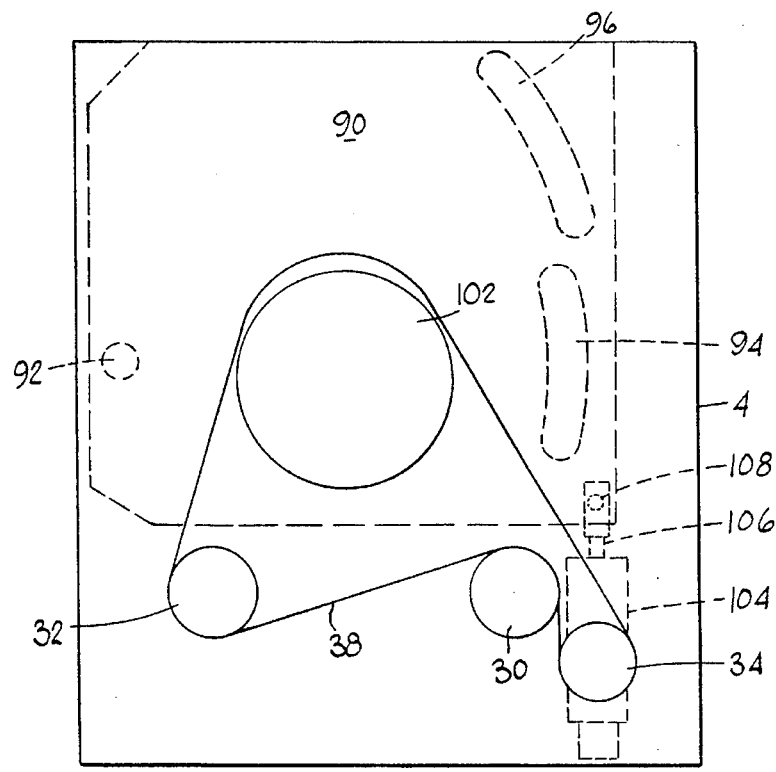
FIGS. 9 and 10 are schematic illustrations of the safety portion of the apparatus of this invention.
Figure 10:
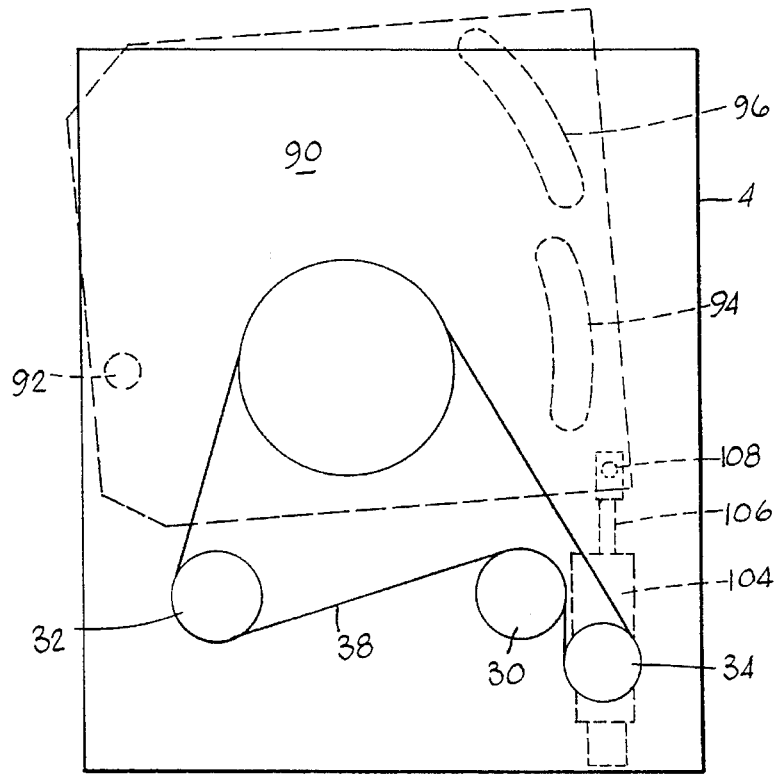

In FIGS. 6–8, there is illustrated the contour 70 of the outer surface of the drive rolls 14 and 16. The contour 70 comprises a central arcuate section 72, two linear sections 74 and 76 and upper and lower cylindrical sections 78 and 80. The central arcuate section 72 has a radius that is slightly smaller than the radius of the circular container ends to be driven by the rollers 14 and 16 similar to the central arcuate surface 66. The linear sections 74 and 76 are tangent to the central arcuate section 72.

The dimensions of the contour of the rollers 14 and 16 will vary with the size of the circular container ends. In one instance where the circular container ends were ends for a beverage container, which ends have a diameter of 2.342 inches, the central arcuate section 72 has a radius of 0.840 inch with its center located 2.035 inches from the axis of the roller; the linear sections 74 and 76 each has a linear extent of about 0.431 inch and formed an included angle with the bottom edge of each cylindrical section of about 49 degrees 15 minutes; each cylindrical section 78 and 80 has an axial extent of 0.250 inch and the diameter of each of the cylindrical sections 78 and 80 is 3.360. In another instance where the beverage container ends have a diameter of 2.452 inches, the center for the central arcuate section 72 is located 1.985 inches from the longitudinal axis of the roller but the radius remains 0.840 inch. The diameter of each cylindrical section is 3.260 inches. The other dimensions remain the same.

The invention also provides safety structures for the apparatus as illustrated in FIGS. 1, 2, 9 and 10. A support plate 90 is pivotally mounted on the base plate 4 by pivot means 92. Two arcuate slots 94 and 96 are formed in the support plate 90 and cooperate with two bolts 98 and 100 threaded into the base plate 4 to guide the pivotal movement of the support plate 90. The drive belt 38 is journalled around a drive pulley 102, the roller pulleys 30 and 32 and the idler pulley 34. An air cylinder 104 is mounted at a fixed location on the base plate 4 and has a piston 106 mounted therein for reciprocating movement. The piston 106 is pivotally connected to the support plate 90 by pivot means 108. The drive motor (not shown) is mounted on the support plate for movement therewith.

In operation, the mounting plate 52 is connected to the mounting plate 110 at the exit end of a relatively long tray 112 over which circular container ends (not shown) are moved by another apparatus 2 (not shown) located downstream from the exit end. The mounting plate 54 is connected to the mounting plate 114 at the entrance end of a relatively long tray 116 over which circular container ends (not shown) are moved by the illustrated apparatus 2. Air is supplied to the air cylinder 104 which moves the piston 106 outwardly to pivot the support plate 90 and apply the proper tension in the drive belt 38. The motor is started to rotate the rollers 14 and 16. Circular container ends are moved by the downstream apparatus over the trays 112 and 44 into the rollers 14 and 16. The rollers 14 and 16 apply forces to the circular container ends to move them over the tray 116. A safety pull cord 124 extends parallel to the trays 112, 44 and 116 and is connected to the control means which controls the supply of air to the air cylinder 104. When the safety pull cord 124 is pulled conventional internal spring means (not shown) in the air cylinder 104 retract the support plate 90 to move the drive pulley 102 out of contact with the drive belt 38 to stop the rotation of the pulleys 14 and 16 and the movement of the circular container ends.

In FIG. 8 there is illustrated the deformation of the rollers 14 and 16 as a circular container end 118 moves between them. On the left side of FIG. 8, the shaded areas 120 and 122 represent the material in the rollers 14 and 16 that is displaced by the circular container end 118. The right side of FIG. 8 illustrates how the rollers 14 and 16 are deformed. The angles A and B represent the portions of the rollers 14 and 16 that are displaced by the circular container end 118. The portion of the central arcuate section 72 in the angle C may or may not be contacted by the circular container end.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Apparatus for moving circular container ends comprising:

a tray over which said circular container ends are moved;

said tray having a longitudinally extending surface having an arcuate transverse cross-sectional configuration having a radius that is slightly greater than the radius of each of said circular container ends;

an open ended housing comprising a base plate, opposite sidewalls and a partial top wall mounted on each of said opposite sidewalls;

said tray having opposite cut out portions;

a roller formed from an elastic material and having a longitudinal axis mounted on each of said partial top walls and having a portion thereof extending through one of said cut out portions;

each of said rollers having an outer surface extending in the direction of said longitudinal axis;

at least a portion of said outer surface having a contour extending in the longitudinal direction comprising a central arcuate section and a linearly extending section extending from each end of said central arcuate section;

said central arcuate section having a radius that is smaller than the radius of each of said circular container ends;

each of said linearly extending sections extending in a direction that is inclined relative to said longitudinal axis;

said linearly extending sections being located to be contacted and deformed outwardly by portions of each of said circular container ends; and drive means for rotating said rollers to apply a pushing force on each of said circular container ends.

2. Apparatus as in claim 1 wherein said elastic material comprises:

a polyurethane having a durometer of between about 55 and 60 (Shore A).

3. Apparatus as in claim 1 wherein said drive means comprises:

two spaced apart rotatable shafts mounted at fixed locations on said base plate each having one of said rollers mounted thereon for rotation therewith;

a pulley mounted at a fixed location on each shaft for rotating said shafts;

a support plate mounted on said base plate for pivotal movement relative thereto;

a gear reducer having a rotatable shaft mounted on said support plate for pivotal movement therewith;

a rotatable drive pulley mounted on said rotatable shaft for rotational movement therewith;

an air cylinder mounted at a fixed location on said base plate and having a movable piston;

a drive belt journalled around at least said drive pulley and said roller pulleys; and pressure applying means for applying pressure on said movable piston to move said movable piston in one direction to apply a force on said support plate so that said drive belt contacts said drive pulley and said roller pulleys with sufficient tension to rotate said roller pulleys.

4. Apparatus as in claim 3 and further comprising:

control means for disconnecting said pressure applying means; and resilient means for applying a force on said movable piston to move said movable piston in a direction opposite to said one direction to move said drive pulley out of contact with said drive belt.

5. Apparatus as in claim 1 wherein:

at least a portion of said central arcuate section of each of said rollers is not contacted by each of said circular container ends.

6. Apparatus as in claim 5 and further comprising:

each of said rollers having upper and lower portions; and each of said upper and lower portions having an outer surface extending in a direction substantially parallel to said longitudinal axis.

7. Apparatus as in claim 1 wherein:

said deformed linearly extending sections having the shape of said portions of each of said circular container ends when in contact therewith.

8. Apparatus as in claim 7 wherein said elastic material comprises:

a polyurethane having a durometer of between about 55 and 60 (Shore A).

9. Apparatus as in claim 1 wherein:

said linearly extending sections comprising a minor portion of said contour.

10. Apparatus as in claim 9 wherein said drive means comprise:

two spaced apart rotatable shafts mounted at fixed locations on said base plate each having one of said rollers mounted thereon for rotation therewith;

a pulley mounted at a fixed location on each shaft for rotating said shafts;

a support plate mounted on said base plate for pivotal movement relative thereto;

a gear reducer having a rotatable shaft mounted on said support plate for movement therewith;

a rotatable drive pulley mounted on said rotatable shaft for rotational movement therewith;

an air cylinder mounted at a fixed location on said base belt and having a movable piston;

a drive plate journalled around at least said drive pulley and said roller pulleys; and pressure applying means for applying pressure on said movable piston to move said movable piston in one direction to apply a force on said support plate so that said drive belt contacts said drive pulley and said roller pulleys with sufficient tension to rotate said roller pulleys.

11. Apparatus as in claim 10 and further comprising:

control means for disconnecting said pressure applying means; and resilient means for applying a force on said movable piston to move said movable piston in a direction opposite to said one direction to move said drive pulley out of contact with said drive belt.

12. Apparatus as in claim 11 wherein:

at least a portion of said central arcuate section is not contacted by each of said circular container ends.

13. Apparatus as in claim 12 wherein:

said deformed linearly extending sections having the shape of said portions of each of said circular container ends when in contact therewith.

14. Apparatus as in claim 13 wherein said elastic material comprises:

a polyurethane having a durometer of between about 55 and 60 (Shore A).

* * * * *